June 29, 1971  H. MAINKA ET AL  3,588,940
WINDSHIELD CLEANER
Filed Nov. 28, 1969  3 Sheets-Sheet 2
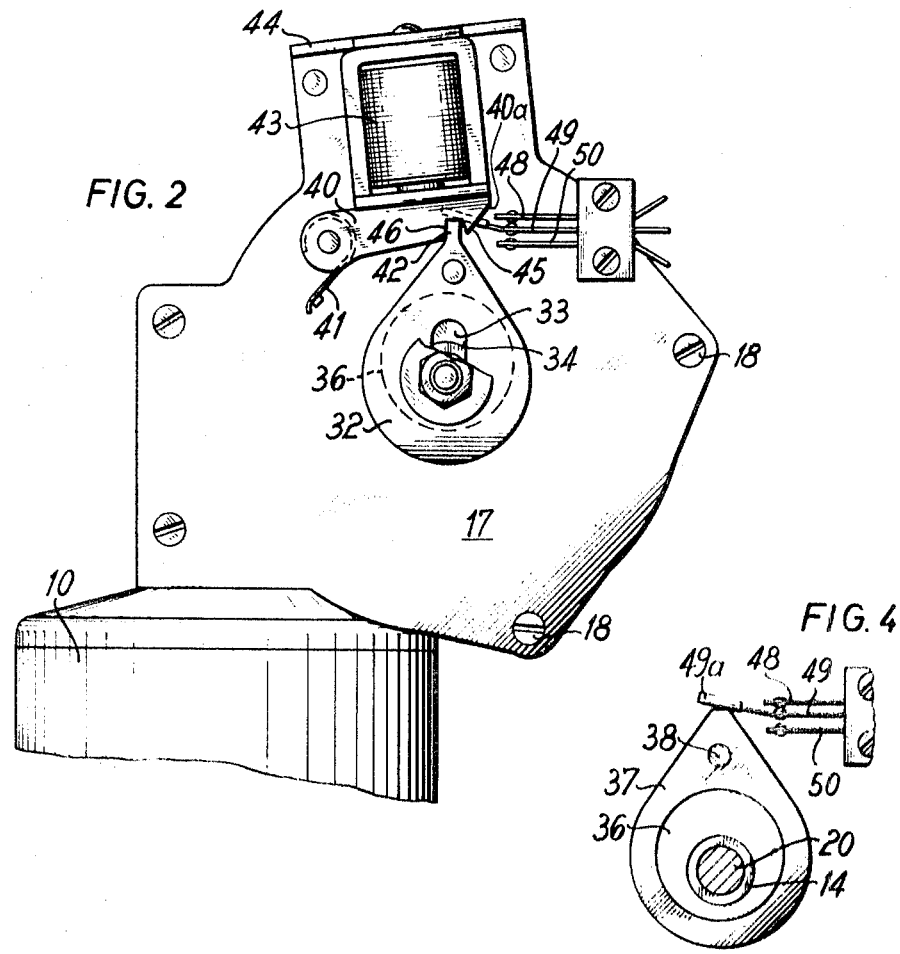
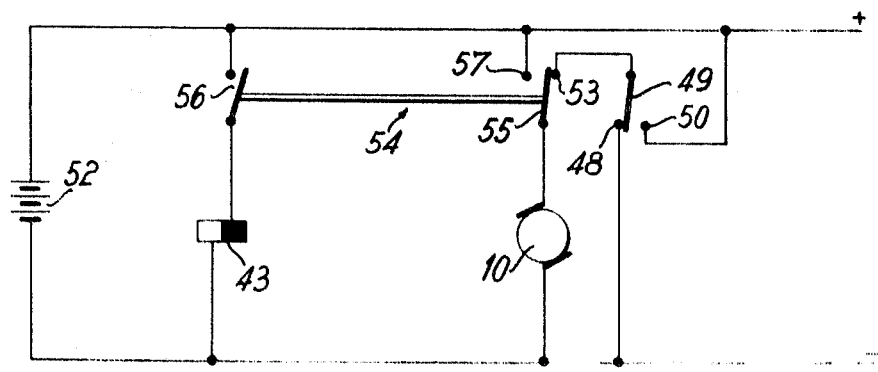
INVENTORS:
Hubert MAINKA
Erich KOLB
By
Michael S. Striker
their ATTORNEY

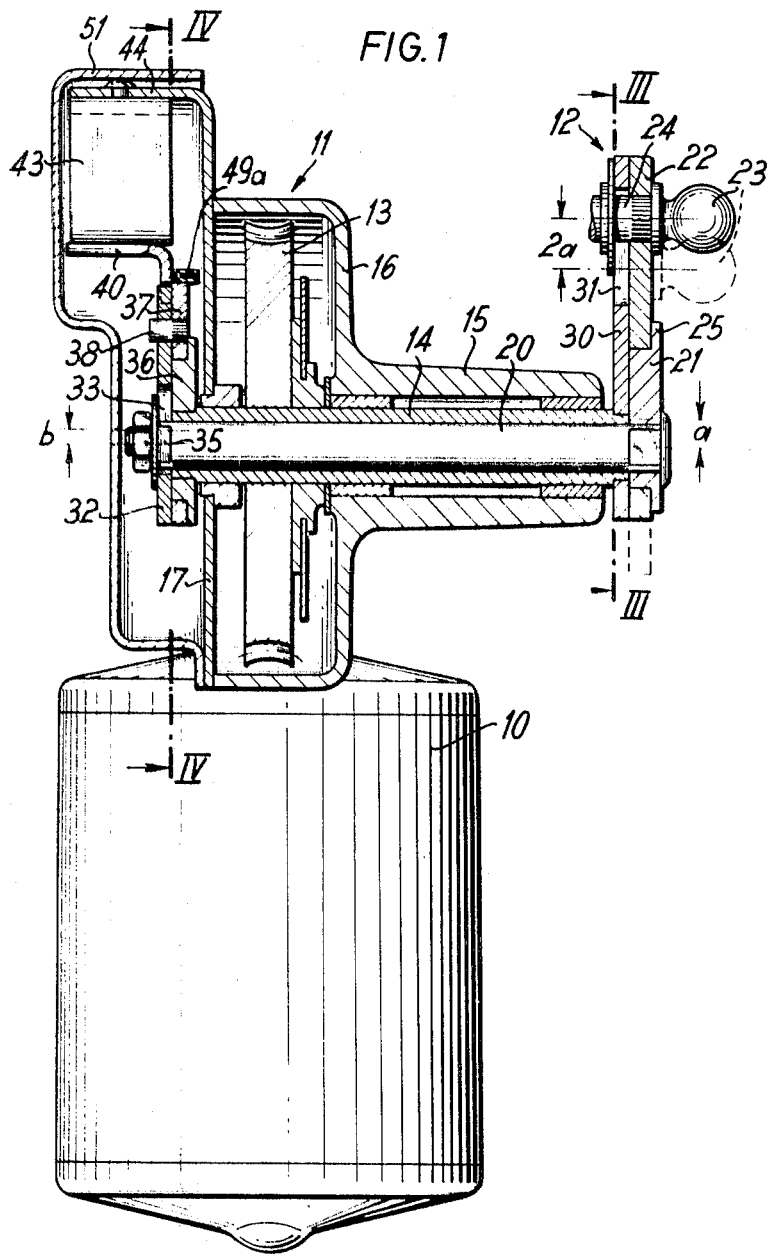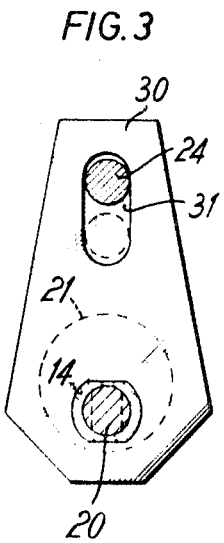

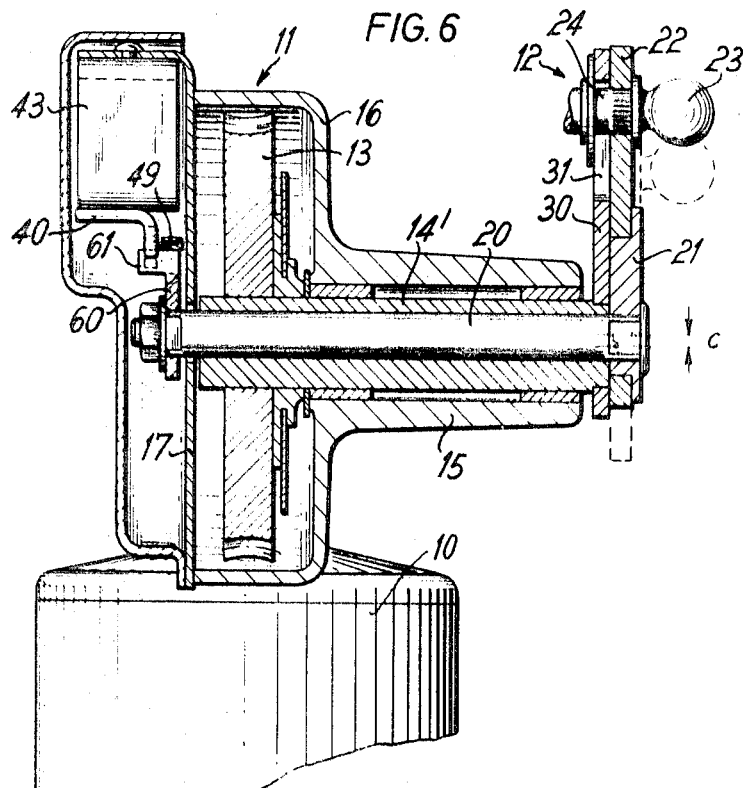
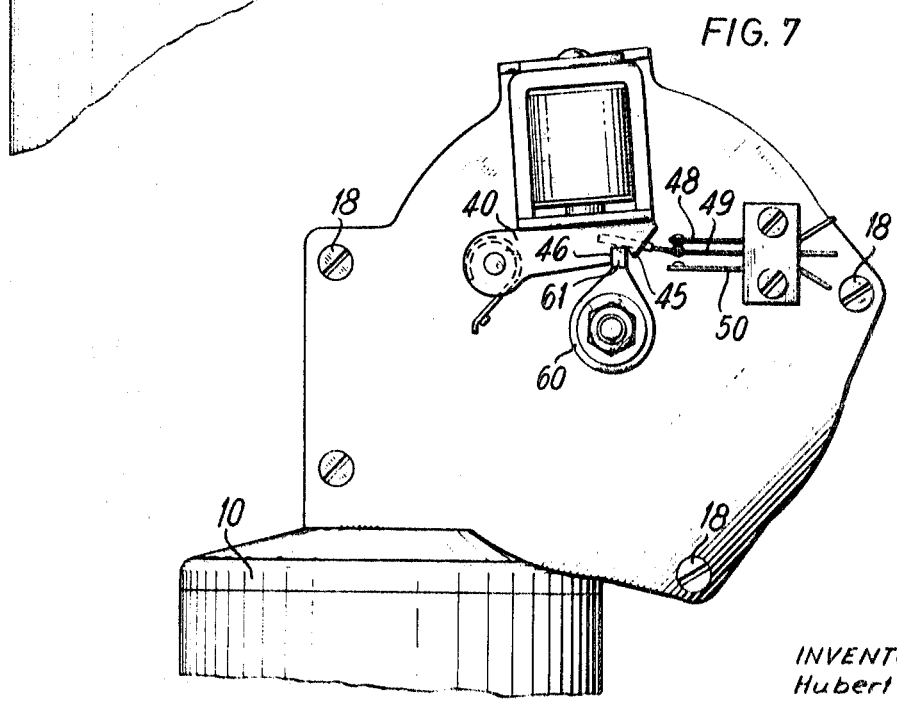

United States Patent Office 3,588,940
Patented June 29, 1971

3,588,940
WINDSHIELD CLEANER
Hubert Mainka, Buhlertal, and Erich Kolb, Eisental, Germany, assignors to Robert Bosch GmbH, Stuttgart, Germany
Filed Nov. 28, 1969, Ser. No. 880,548
Claims priority, application Germany, Nov. 30, 1968, P 18 17 960.3
Int. Cl. B60s 1/08; F16h 21/40
U.S. Cl. 15—250.17                17 Claims

ABSTRACT OF THE DISCLOSURE

A windshield cleaner wherein the blades move back and forth in response to rotation with and move to and from parking positions in response to radial movements of a crank pin relative to a hollow shaft which is driven by an electric motor. A second shaft is rotatable in the hollow shaft and the crank pin receives motion from a crank arm including an eccentric on the second shaft, a strap surrounding the eccentric and carrying the crank pin, and a plate which is rigid with the hollow shaft and is coupled with the strap in such a way that the latter rotates the rank pin about the axis of the hollow shaft when the two shafts rotate as a unit and that the crank pin moves radially of the hollow shaft when the latter rotates with reference to the second shaft.

CROSS-REFERENCE TO RELATED INVENTION

The windshield cleaner of the present invention constitutes an improvement over and a further development of the windshield disclosed in Pat. No. 3,465,378 granted Sept. 9, 1969, to Erich Kolb and assigned to the same assignee.

BACKGROUND OF THE INVENTION

The present invention relates to windshield cleaners for use in automotive vehicles, and more particularly to improvements in those parts which transmit motion to the blade or blades of a windshield cleaner. As a rule, the prime mover of a windshield cleaner drives a crank having a crank pin which transmits motion to a linkage including the arms of the wiper blades. In certain recent types of windshield cleaners, the blades move back and forth between two first positions to sweep predetermined areas of the windshield, and each blade is further movable to a parking position in which it remains when the windshield cleaner is idle. Movements of the blades to and from parking positions are effected by imparting to the crank pin a second movement which is superimposed on the movement necessary to reciprocate the blades between their respective first positions.

In certain presently known windshield cleaners of the just outlined character, the crank is rigidly secured to a first shaft which is rotatable with and can move laterally in a hollow second shaft. The lateral movement of the first shaft produces those movements of the crank pin which are necessary to move the blades of the windshield cleaner to or from their parking positions. Thus, the hollow shaft must be provided with a large-diameter bore which permits requisite lateral movements of the first shaft. Since the wall thickness of the hollow shaft cannot be reduced at will, the external diameter of this shaft is rather large which contributes to its bulk and weight and necessitates the use of a strong motor. Furthermore, the transmission which normally connects the motor of the windshield cleaner with the first shaft must accommodate a substantial number of parts so that the transmission casing occupies too much room.

SUMMARY OF THE INVENTION

An object of the present invention is to provide a windshield cleaner wherein the blade or blades are movable to and from parking positions in a novel and improved way and wherein such movements of the blades are effected by a small number of simple, rugged and long-lasting parts.

Another object of the invention is to provide a windshield cleaner wherein the element which drives one or more blades receives motion from a prime mover by way of a hollow shaft and a second shaft which is mounted in the hollow shaft in a novel and improved way.

A further object of the invention is to provide the windshield cleaner with novel means for initiating movements of the blade or blades to and from parking positions.

An additional object of the invention is to provide a windshield cleaner which is capable of operating properly despite the fact that the external diameter of its hollow shaft is substantially less than the external diameters of hollow shafts in presently known windshield cleaners.

A concomitant object of the invention is to provide a windshield cleaner wherein the blade or blades are automatically returned to parking positions when the operator of the vehicle actuates the means which ultimately stops the motor of the windshield cleaner.

An ancillary object of the invention is to provide a windshield cleaner which can be installed in all or nearly all types of automotive vehicles and wherein the element which drives one or more blades forms part of a novel and improved crank structure.

The invention is embodied in a windshield cleaner which comprises at least one blade and includes a prime mover, preferably comprising an electric motor and a transmission in the form of a worm drive, a hollow first shaft which is rotatable by the prime mover (the first shaft is preferably rigid with the worm wheel of the worm drive), a second shaft which is rotatably received in the first shaft but need not move laterally with respect thereto, blocking means operable to hold the second shaft against rotation with the first shaft and novel crank means including an eccentric fixed to the second shaft, a blade-driving element (e.g., a suitable crank pin) arranged to move the blade or blades back and forth between two first positions in response to rotation about the axis of the first shaft and to move the blade or blades between one of such first positions and a parking position in response to movement radially of the first shaft, a strap rotatably surrounding the eccentric and supporting the blade-driving element, a motion transmitting member rigid with the first shaft, and connecting means coupling the motion transmitting member with the strap for rotation about the axis of the first shaft and with sufficient freedom of radial movement of the strap to permit rotation of the first shaft with reference to the second shaft when the blocking means is operative whereby the strap moves the blade-driving element radially of the first shaft.

It will be seen that the second shaft need not move laterally of the first shaft when the latter rotates with reference to the second shaft. This is due to the novel construction of the crank means which enables the strap and the blade-driving element to perform necessary radial movements with reference to the first shaft merely in response to rotation of the first shaft with reference to the second shaft. Thus, the eccentricity of the eccentric, not the eccentricity of the second shaft with reference to the first shaft, determines the extent of radial movement of the blade-driving element.

The novel features which are considered as characteristic of the invention are set forth in particular in the appended claims. The improved windshield cleaner itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partly side elevational and partly sectional view of a windshield cleaner which embodies one form of the invention;

FIG. 2 is a fragmentary end elevational view of the windshield cleaner as seen from the left-hand side of FIG. 1, with the lid for the electromagnet of the blocking means removed;

FIG. 3 is a sectional view as seen in the direction of arrows from the line III—III of FIG. 1;

FG. 4 is a sectional view as seen in the direction of arrows from the line IV—IV of FG. 1;

FIG. 5 illustrates the electric circuit diagram of the windshield cleaner;

FIG. 6 is a fragmentary partly side elevational and partly sectional view of a second windshield cleaner; and FIG. 7 is a view as seen in the direction of arrows from the line VII—VII of FIG. 6.

DESCRIPTION OF THE PREFERRED EMBODIMENTS

Referring first to FIGS. 1 to 4, there is shown a portion of a windshield cleaner which comprises a prime mover here illustrated as including an electric motor 10 whose output shaft (not shown) carries a worm meshing with a worm wheel 13 forming part of a worm drive 11 and fixedly secured to a hollow shaft 14. The purpose of the worm drive 11 is to drive a crank 12. The hollow shaft 14 is rotatable in a sleeve 15 forming part of a housing or casing 16. One side of the casing is open and this open side is normally closed by a cover 17 which is separably secured to the casing by means of screws 18 or similar fasteners.

A portion of the crank 12 is mounted on a shaft 20 which is rotatable in and extends beyond both axial ends of the hollow shaft 14. In contrast to presently known windshield cleaners, the shaft 20 is coaxial with the hollow shaft 14. One end portion of the shaft 20 is non-rotatably secured to a disk-shaped eccentric 21 whose eccentricity is indicated at $a$. The eccentric 21 is surrounded by a strap or crank arm 22. This strap 22 is provided or connected with a blade-driving crank pin 23 which is remote from the shaft 20 and whose protuberance or stem 24 extends beyond the strap 22 in a direction toward the casing 16. The crank pin 23 serves to transmit motion to the customary linkage of the windshield wiper mechanism which preferably comprises two blades reciprocable back and forth between two first positions in response to rotation of the crank pin 23 about the axis of the shaft 20 and movable between one of their first positions and a parking position in response to radial movement of the crank pin. The eccentric 21 is formed with an extension or flange 25 which overlies one side of the strap 22 to hold the latter against movement away from the sleeve 15.

The member which transmits motion from the hollow shaft 14 to the strap 22 and crank pin 23 comprises a plate 30 which is fixedly secured to the hollow shaft 14 and is adjacent to one side of the strap 22 to hold the latter against movement away from the flange 25. The plate 30 has an elongated slot 31 which extends radially of the common axis of the shafts 14, 20 and receives the stem 24 of the crank pin 23 with limited freedom of lateral movement. The length of the slot 31 is selected in such a way that the stem 24 can move back and forth therein when the shaft 14 rotates with reference to the shaft 20, i.e., the length of the slot 31 exceeds the maximum extent of radial movement of the strap 22. The length of the slot 31 minus the diameter of the stem 24 can exceed the distance $2a$. The stem 24 and the slot 31 constitute a connecting means which couples the strap 22 for rotation with the motion transmitting plate 30 (about the axis of the shaft 14) with sufficient freedom of radial movement of the strap to permit rotation of the shaft 14 when the shaft 20 is held against rotation.

The cover 17 is formed with an opening for the passage of the end portions of shafts 14 and 20. That end portion of the shaft 20 which extends beyond the cover 17 carries a blocking disk 32 and this blocking disk is formed with an elongated slot 33 (FIG. 2) flanked by parallel surfaces 34 which engage flats 35 (FIG. 1) of the shaft 20. Thus, the blocking disk 32 rotates with but is movable radially of the shaft 20 to the extent determined by the length of the slot 33. That end portion of the hollow shaft 14 which extends beyond the cover 17 carries a fixedly mounted disk-shaped eccentric 36 whose eccentricity is indicated at $b$ (FIG. 1) and which is adjacent to the blocking disk 32. The eccentric 36 is surrounded by a strap 37 (see FIG. 4) having a coupling pin 38 which extends into a complementary bore or hole of the blocking disk 32. When the shaft 14 rotates with reference to the shaft 20, the eccentric 36 moves the blocking disk 32 by way of the strap 37 and coupling pin 38 so that the disk 32 moves back and forth radially of the shaft 20.

The outer side of the cover 17 carries a pivotable retaining pawl 40 which is biased by a spring 41 so that it tends to turn in a clockwise direction, as viewed in FIG. 2, namely, into the path of movement of a projection or tooth 42 provided on the blocking disk 32. The pawl 40 constitutes the armature of a blocking electromagnet 43 whose winding is secured to a suitably deformed extension 44 of the cover 17. The pawl 40 is formed with two retaining shoulders or faces 45, 46 which define a recess having a width corresponding to that of the tooth 42 on the blocking disk 32. FIG. 2 shows the pawl 40 in a position in which the tooth 42 is received in the recess between the shoulders 45, 46.

The cover 17 further supports the contacts 48, 49, 50 of a two-way electric switch. These contacts are insulated from each other and the median contact 49 is provided with an insulated extension 49a which can be engaged by a lobe of the strap 37 to move this contact into current-conducting engagement with the contact 48. The median contact 49 is elastic and tends to move to a position in which it engages the contact 50. The lobe of the strap 37 engages the median contact 49 and holds it in engagement with the contact 48 when the tooth 42 of the blocking disk 32 is engaged by the retaining pawl 40 (see FIG. 2). A protective cap or lid 51 is separably secured to the cover 17 and/or casing 16 to normally conceal the electromagnet 43, its armature 40, the blocking disk 32, the strap 37 and the contacts 48–50.

As shown in FIG. 5, the contact 48 is connected to the negative pole and the contact 50 is connected to the positive pole of an energy source 52, e.g., a battery. The median contact 49 can be electrically connected with the movable contact 55 of a master switch 54 which is actuatable by hand to move the movable contact 55 between two fixed contacts 53, 57. The contacts 53, 57 are respectively connected with the movable contact 49 and with the positive pole of the energy source 52. The motor 10 is in circuit with the energy source 52 when the movable contact 55 engages the fixed contact 57 or the contact 53 provided that the contact 49 engages the contact 50. A second movable contact 56 of the master switch 54 then completes the circuit of the blocking electromagnet 43. When the master switch 54 is in the open position shown in FIG. 5, the motor 10 is shortcircuited by way of the contacts 55, 53, 49, 48. The motor 10 is connected with the negative pole of the energy source 52 and with the movable contact 55 of the master switch 54.

The purpose of the master switch 54 is to start and stop the windshield cleaner at the will of the operator of the vehicle. The two-way switch including the contacts 48, 49, 50 is actually a limit switch whose main function is to insure that the windshield cleaner continues to operate after the master switch 54 is moved to open position until the blades of the windshield wiper assembly return to their parking positions. The blades are then out of the way and cannot interfere with the vision of the driver.

The operation:

The drawing shows the parts of the windshield cleaner in those positions which correspond to parking positions of the windshield wiper blades. The eccentric 21 maintains the crank pin 23 in a starting position in which the axis of the stem 24 is moved away from its normal path by a distance 2a, namely twice the eccentricity of the member 21. During movement from its normal position to such starting position, the crank pin 23 causes the linkage of the windshield wiper assembly to perform an additional movement which results in movement of the blades to the parking positions. The strap 37 urges the contact 49 against the contact 48 so that the contact 49 cannot return into engagement with the fixed contact 50 and the limit switch prevents rotation of the motor 10.

In order to start the windshield cleaner, the operator closes the master switch 54 to complete the circuit of the blocking electromagnet 43 (by way of the movable contact 56) and to complete the circuit of the motor 10 by way of the contacts 55, 57. The motor 10 then rotates the worm 13 which drives the hollow shaft 14 and the motion transmitting plate 30 of the crank 12. The electromagnet 43 attracts the retaining pawl 40; this pawl is held close to its upper end position (as viewed in FIG. 2) by the blocking disk 32 in a manner to be fully described later. However, the pawl 40 continues to hold the blocking disk 32 and hence the shaft 20 for a certain interval of time which suffices to enable the crank 12 to complete one half of a revolution. During such rotation of the crank 12, the hollow shaft 14 rotates with reference to the shaft 20 whereby the strap 22 rotates with reference to the eccentric 21 and the eccentric 36 rotates with reference to the strap 37. Consequently, the eccentric 21 causes the strap 22 to move the crank pin 23 radially toward the common axis of the shafts 14, 20 by the distance 2a. At the same time, the eccentric 36 moves the blocking disk 32 radially of the shafts 14, 20 and away from the blocking electromagnet 43 by way of the strap 37 and coupling pin 38. This causes the tooth 42 to slide along the shoulder 46 of the retaining pawl 40 until the blocking lever 32 and the shaft 20 are free to rotate with the hollow shaft 14.

During the first half revolution of the crank 12, the blades of the windshield wiper assembly are moved away from their parking positions and move a certain distance into the respective fields of the windshield. As the crank 12 continues to rotate, the shafts 14 and 20 turn without slippage as a unit because the reaction forces produced by the linkage of the windshield wiper assembly and acting on the crank pin 23 produces a self-locking action between the strap 22 and the eccentric 21. Thus, the strap 22 is "coupled" to the eccentric 21 whereby the crank pin 23 travels along a circular path whose center is located on the common axis of the shafts 14 and 20. This causes the linkage to move the blades back and forth between their respective first positions.

The aforementioned radial movement of the strap 37 during the first half revolution of the crank 12 causes the lobe of the strap 37 to move downwardly, as viewed in FIG. 4, so that the median contact 49 of the limit switch is free to move toward and to engage the contact 50. The contacts 49, 50 then connect the positive pole of the energy source 52 with the fixed contact 53 of the master switch 54. The relative movement of the strap 37 with reference to the eccentric 36 ceases when the crank 12 completes one half of the first revolution because the shaft 20 then rotates with the hollow shaft 14, i.e., the strap 37 is not prevented from rotating with the shafts 14, 20.

In order to arrest the windshield wiper blades, the operator returns the master switch 54 to the illustrated open position. This opens the circuit of the blocking electromagnet 43 (contact 56) and one terminal of the motor 10 is then connected with the movable contact 49 of the limit switch. This movable contact 49 is in engagement with the contact 50 so that the motor circuit remains completed by way of the contacts 55, 53, 49 and 50.

Deenergization of the blocking electromagnet 43 results in pivotal movement of the retaining pawl 40 under the action of the spring 41 whereby the pawl moves into the path of rotary movement of the blocking disk 32, i.e., into the path of movement of the tooth 42. This tooth 42 engages the pawl 40 not later than upon completion of a full revolution of the shaft 20 whereby the tooth 42 first pivots the lever 40 in a counterclockwise direction (by sliding along the inclined face 40a) and thereupon enters the recess between the shoulders 45, 46 to hold the blocking disk 32 against further rotation with the shaft 14. Thus, the shaft 14 rotates with reference to the shaft 20 to effect rotation of the strap 22 and plate 30 with reference to the eccentric 21. This causes the crank pin 23 to move radially outwardly, i.e., back to the position shown in FIGS. 1 and 3. When the shaft 14 completes one half revolution with reference to the arrested shaft 20, the crank pin 23 shifted radially outwardly by a distance 2a which causes the linkage to return the wiper blades to their parking positions.

When the shaft 20 is arrested in response to entry of the tooth 42 into the recess between the shoulders 45, 46 of the retaining pawl 40, the eccentric 36 rotates with reference to the blocking disk 32, coupling pin 38 and strap 37. This causes the strap 37 to move radially outwardly by a distance 2b (i.e., upwardly, as viewed in FIG. 1) to move the blocking disk 32 in the same direction. This causes the retaining pawl 40 to pivot toward the electromagnet 43 and to remain close to its uppermost position. As the strap 37 moves upwardly, its lobe disengages the movable contact 49 from the contact 50 and causes the contact 49 to engage the contact 48. The motor circuit is then open and the motor 10 is braked in automatic response to engagement of the contact 49 with contact 48.

An advantage of the feature that the blocking disk 32 holds the retaining pawl 40 close to the blocking electromagnet 43 when the windshield cleaner is idle is that a relatively weak electromagnet suffices to pivot the pawl 40 away from engagement with the tooth 42 when the windshield cleaner is started again. The shoulders 45, 46 of the pawl 40 hold the tooth 42 and hence the blocking disk 32 when the blades dwell in their parking positions.

FIGS. 6 and 7 illustrate a portion of a second windshield cleaner wherein the contact 49 of the limit switch is movable in a different way. The windshield cleaner comprises a blocking device 40, 43, 60 including a blocking disk 60 which is fixedly secured to the shaft 20. The disk 60 has a projection or tooth 61 which extends radially as well as axially of the shaft 20 (see FIG. 6) so that it can cooperate with the retaining pawl 40 and is also capable of moving the contact 49.

The shaft 20 is mounted in an eccentric bore of the hollow shaft 14'. The eccentricity of the shaft 20 is shown at c. When the blocking disk 60 is held by the retaining pawl 40, the disk 60 is shifted radially outwardly by the distance 2c whereby the tooth 61 moves the contact 49 into engagement with the contact 48 and the pawl 40 is pivoted toward the blocking electromagnet 43. The construction of the crank 12 is the same as described in connection with FIGS. 1 to 4. The remaining parts shown but not specifically mentioned in connection with FIGS. 6 and 7 are identical with similarly numbered parts of the apparatus shown in FIGS. 1–4.

An advantage of the windshield cleaner which is shown in FIGS. 6 and 7 is that it comprises very simple means for holding the shaft 20 against rotation with the hollow shaft 14' and that a single part (blocking disk 60) suffices to pivot the retaining pawl 40 as well as to actuate the movable contact 49 of the limit switch. The eccentricity c of the shaft 20 with reference to the shaft 14' can be much smaller than in presently known windshield cleaners because it must suffice only to insure movement of the contact 49 into engagement with the contact 48. Thus, such eccentricity need not equal half the distance which the crank pin 23 must cover in order to move the wiper blades to or from their parking positions. This is achieved by the eccentric 21 whose eccentricity can exceed the eccentricity c.

The two illustrated embodiments of the improved windshield cleaner exhibit the common feature that the blocking device 32, 40, 43 or 40, 43, 60 occupies very little room and need not be installed in the interior of the transmission casing 16. This is due to the fact that such blocking device need not cooperate with the worm wheel 13. The blocking device is much simpler than the blocking devices of presently known windshield cleaners, i.e., the shafts 14, 20 or 14', 20 need not be positively coupled to each other at any time because the aforementioned, reaction forces which develop when the crank pin 23 drives the linkage for the windshield wiper blades suffice to insure rotation of the strap 22 with the eccentric 21. The self-locking action between the eccentric 21 and strap 22 is terminated when the blocking disk 32 or 60 engages with the retaining pawl 40.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a windshield cleaner having at least one blade, a combination comprising a prime mover; a hollow first shaft rotatable by said prime mover; a second shaft rotatably received in said first shaft; blocking means operable to hold said second shaft against rotation with said first shaft; and crank means including an eccentric fixed to said second shaft, a blade-driving element arranged to move the blade back and forth between two first positions in response to rotation about the axis of said first shaft and to move the blade between one of such first positions and a parking position in response to movement radially of said first shaft, a strap rotatably surrounding said eccentric and supporting said blade-driving element, a motion transmitting member rigid with said first shaft, and connecting means coupling said motion transmitting member with said strap for rotation about the axis of said first shaft and with sufficient freedom of radial movement of said strap to permit rotation of said first shaft with reference to said second shaft when said blocking means is operative whereby said strap moves said blade-driving element radially of said first shaft.

2. A combination as defined in claim 1, wherein said prime mover comprises an electric motor and a worm drive providing an operative connection between said motor and said first shaft.

3. A combination as defined in claim 1, wherein said connecting means comprises a protuberance provided on said strap and received in a slot provided in said motion transmitting member and extending radially of said first shaft.

4. A combination as defined in claim 3, wherein said blade-driving element is a crank pin and wherein said protuberance constitutes the stem of said crank pin.

5. A combination as defined in claim 1, wherein said strap has a first side and a second side and wherein said eccentric comprises an extension overlapping one side of said strap, said motion transmitting member being adjacent to the other side of said strap.

6. A combination as defined in claim 5, wherein said motion transmitting member comprises a plate which is adjacent to said eccentric and wherein said connecting means comprises a slot provided in said plate and extending radially of said first shaft and a stem provided on said blade-driving element and extending into said slot.

7. A combination as defined in claim 1, wherein said blocking means comprises a blocking member fixed to said second shaft and a retaining member movable into and out of retaining engagement with said blocking member.

8. A combination as defined in claim 7, wherein one of said last mentioned members comprises a projection and the other of said last mentioned members is provided with a recess receiving said projection when said retaining member engages said blocking member.

9. A combination as defined in claim 7, wherein said blocking member is movable radially of said second shaft and further comprising means for moving said blocking member radially of said second shaft in response to rotation of said first shaft with reference to said second shaft while said retaining member engages with said blocking member.

10. A combination as defined in claim 9, wherein the means for moving said blocking member radially comprises a second eccentric fixed to said first shaft and a second strap rotatably surrounding said second eccentric and connected with said blocking member to effect radial movement of said blocking member in response to rotation of said second eccentric with reference to said second strap.

11. A combination as defined in claim 10, further comprising actuating means for said prime mover, said actuating means comprising switch means having contact means adjacent to the path of movement of said second strap and movable by said second strap when said second eccentric assumes a predetermined angular position with reference to said second strap.

12. A combination as defined in claim 1, wherein said first shaft is provided with an eccentric bore for said second shaft and wherein said blocking means comprises a blocking member affixed to said second shaft and a retaining member movable into and out of retaining engagement with said blocking member.

13. A combination as defined in claim 12, further comprising actuating means for said prime mover, said actuating means comprising switch means having contact means adjacent to the path of movement of said blocking member and movable by said blocking member in a predetermined angular position of said second shaft with reference to said first shaft.

14. A combination as defined in claim 1, wherein said prime mover comprises a casing and wherein said shafts comprise end portions extending through and outwardly from said casing, said blocking means including a portion provided on one of said shafts externally of said casing.

15. A combination as defined in claim 14, wherein said prime mover further comprises an electric motor and a worm drive accommodated in said casing and providing an operative connection between said motor and said first shaft, said casing comprising a removable cover and said end portions of said shafts extending outwardly through said cover.

16. A combination as defined in claim 14, wherein said blocking means further comprises electromagnet means supported by and located externally of said casing.

17. A combination as defined in claim 16, wherein said portion of said blocking means includes a blocking member fixed to said end portion of said second shaft and said electromagnet means comprises an armature movable into and out of retaining engagement with said blocking member.

References Cited

UNITED STATES PATENTS

| | | | |
|---|---|---|---|
| 2,753,721 | 7/1956 | Latta | 15—250.17X |
| 2,959,968 | 11/1960 | Gute et al. | 74—70 |
| 3,091,128 | 5/1963 | De Rees et al. | 15—250.17X |
| 3,115,598 | 12/1963 | Ziegler | 74—70X |
| 3,465,378 | 9/1969 | Kolb | 15—250.17 |

PETER FELDMAN, Primary Examiner

U.S. Cl. X.R.

74—75, 600